United States Patent [19]

Nanjoh

[11] 4,273,424
[45] Jun. 16, 1981

[54] VARIABLE ABERRATION LENS SYSTEM

[75] Inventor: Yuhsuke Nanjoh, Urawa, Japan

[73] Assignee: Mamiya Koki Kabushiki Kaisha (Mamiya Camera Co., Ltd.), Tokyo, Japan

[21] Appl. No.: 42,779

[22] Filed: May 29, 1979

[30] Foreign Application Priority Data

May 31, 1978 [JP] Japan ............................. 53/65048
Oct. 20, 1978 [JP] Japan ............................. 53/128421

[51] Int. Cl.$^3$ .......................... G02B 9/34; G02B 9/64; G02B 13/20
[52] U.S. Cl. .................................. 350/431; 350/463; 350/469
[58] Field of Search ..................... 350/188, 214, 220

[56] References Cited

U.S. PATENT DOCUMENTS

| | | |
|---|---|---|
| 1,463,132 | 7/1923 | Graf . |
| 3,152,211 | 10/1964 | Cox et al. ................. 350/220 |
| 3,447,861 | 6/1969 | Schlegel .................. 350/220 |
| 4,124,276 | 11/1978 | Okano et al. .............. 350/188 |

FOREIGN PATENT DOCUMENTS 52-141223 11/1977 Japan .

Primary Examiner—John K. Corbin
Assistant Examiner—Scott J. Sugarman
Attorney, Agent, or Firm—Cushman, Darby & Cushman

[57] ABSTRACT

A variable aberration lens system usable not only as a general photographic lens but also a soft focus lens is provided. The variable aberration lens system includes at least a variable meniscus-shaped air space and cementing surface which are respectively concave against a stop provided therein. A very high resolving power and high contrast can be obtained when the variable aberration lens system is used as the general photographic lens, and a photograph in which an out focus image of the background or foreground is fine can be obtained by varying the width of the air space when the variable aberration lens system is used as the soft focus lens.

5 Claims, 27 Drawing Figures

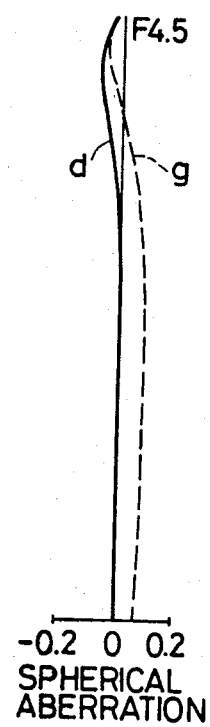 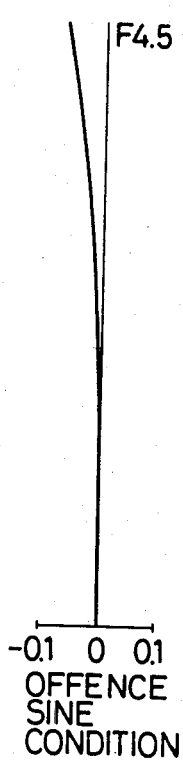 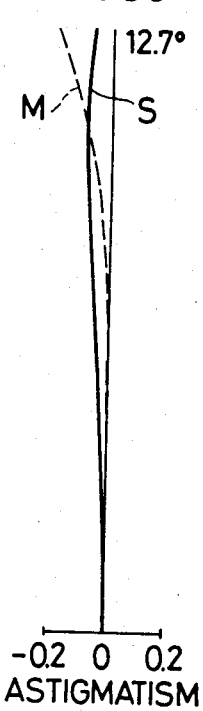 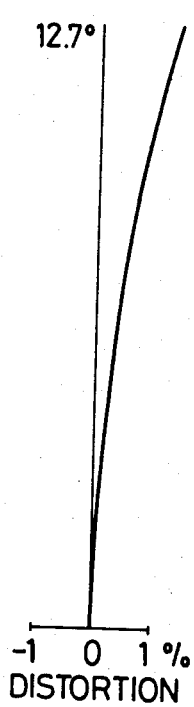
FIG. 3a — SPHERICAL ABERRATION  
FIG. 3b — OFFENCE SINE CONDITION  
FIG. 3c — ASTIGMATISM  
FIG. 3d — DISTORTION
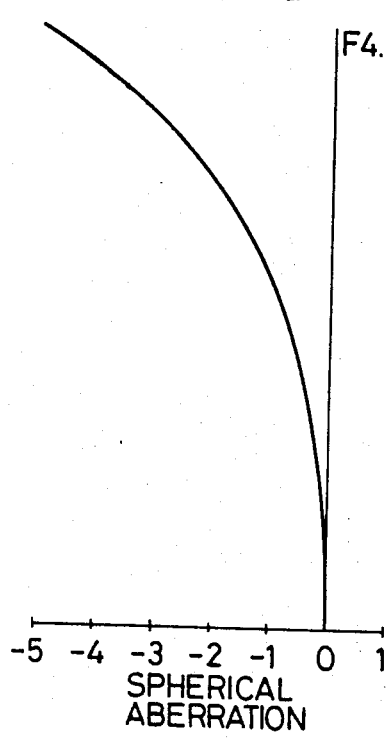 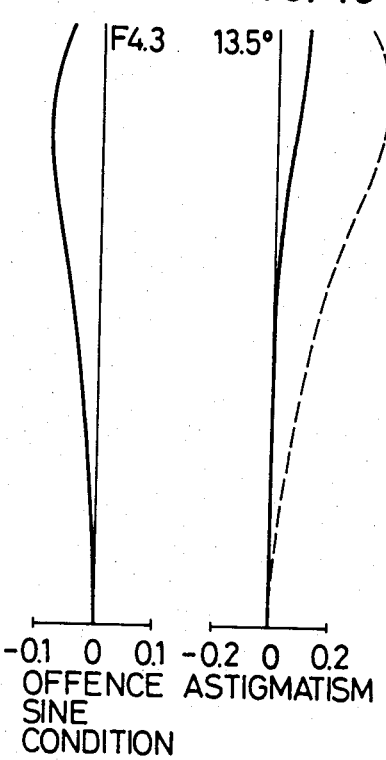 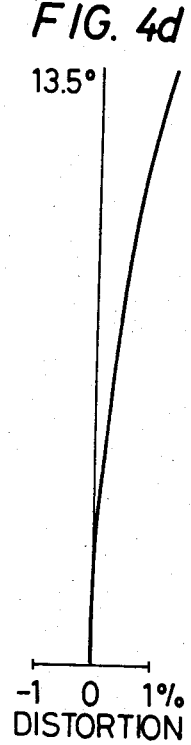 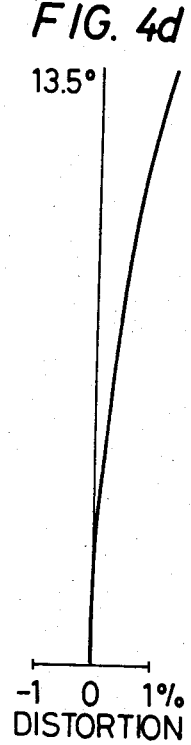
FIG. 4a — SPHERICAL ABERRATION  
FIG. 4b — OFFENCE SINE CONDITION  
FIG. 4c — ASTIGMATISM  
FIG. 4d — DISTORTION

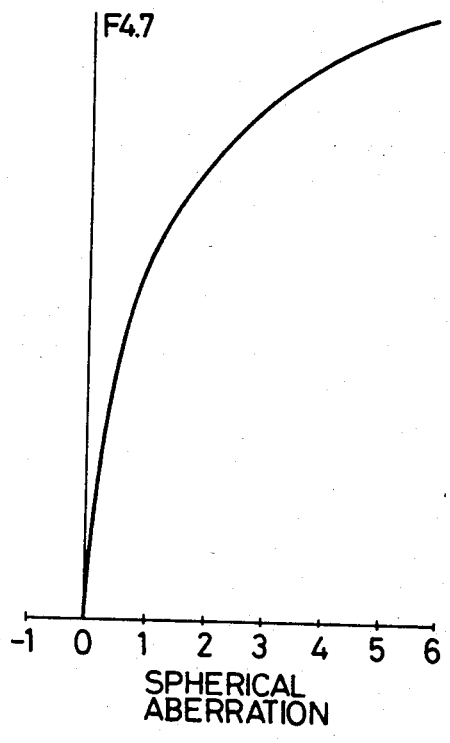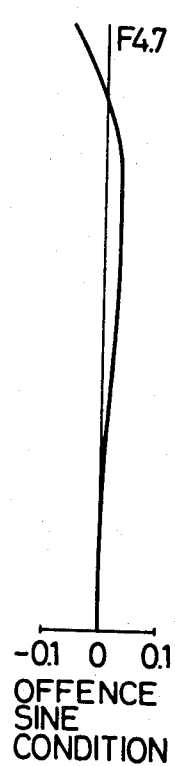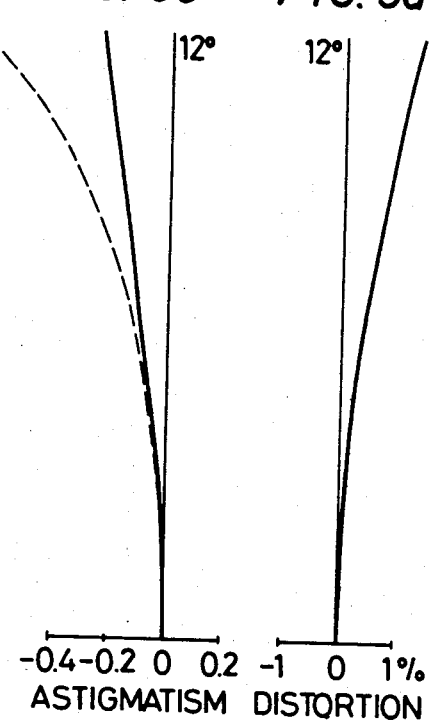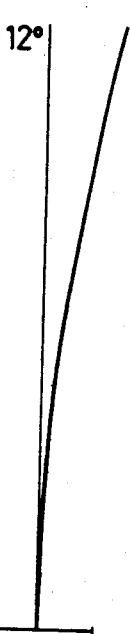
FIG. 5a  FIG. 5b  FIG. 5c  FIG. 5d
SPHERICAL ABERRATION | OFFENCE SINE CONDITION | ASTIGMATISM | DISTORTION
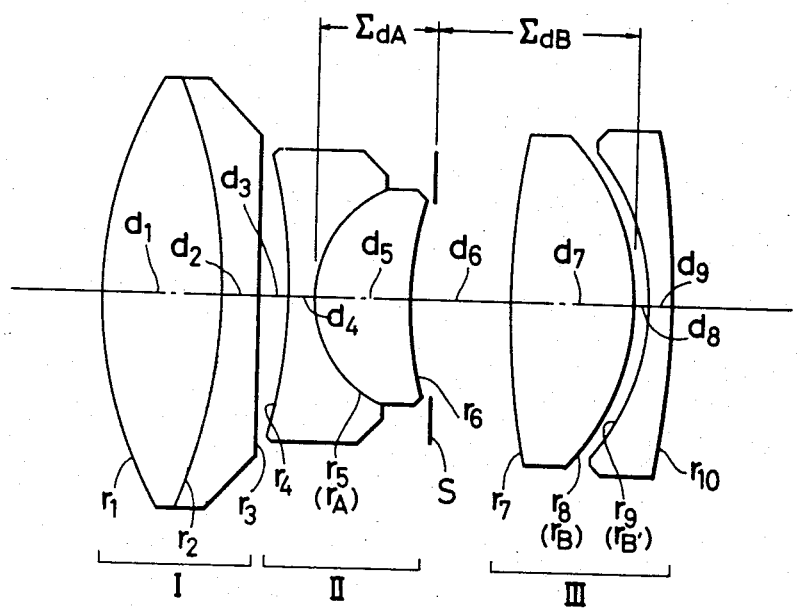
FIG. 6

VARIABLE ABERRATION LENS SYSTEM

BACKGROUND OF THE INVENTION (a) Field of the Invention

The present invention relates to a variable aberration lens system which can be used not only as a general photographic lens but also can be a soft focus lens by varying the spherical aberration.

(b) Brief Description of the Prior Art

The performance required as of a soft focus lens used mostly for photographing a portrait or the like is to make a picture covering a soft kind of large halo around a core small enough. For that purpose, it is desirable to make the ratio of a sum $\Sigma\bar{I}$ of the fifth degree spherical aberration coefficients to a sum $\Sigma I$ of the third degree spherical aberration coefficients $\Sigma\bar{I}/\Sigma I > 150$ so that the higher degree spherical aberration may be generated to be larger than the lower degree spherical aberration and the contrast of the halo with the core may be larger.

One of the methods which can attain the above mentioned object is shown in Japanese published unexamined patent application No. 141223/77. That is to say, by so forming the cementing surface a of the third lens group in FIG. 1 that the center of curvature may be near a stop S, the radius of curvature may be smaller and the difference between the refractive indexes in the front and rear of said cementing surface may be very small, it has been successful to generate a spherical aberration of a higher degree on this cementing surface. However, in this method, as the spherical aberration is generated on the cementing surface, when the spherical aberration is made smaller and is used for a general photographic lens, a smaller stop aperture will have to be selected. Therefore, such method has a defect that a field of view of the finder tends to become dark.

Another method of attaining the above mentioned object is shown in FIG. 2 of U.S. Pat. No. 1,463,132 and in U.S. Pat. No. 4,124,276. That is to say, an air space is provided between two nearly concentric surfaces which are concave against the stop so that a higher degree spherical aberration may be generated by the cancellation effect through these two surfaces. In this method, by making the radii of curvature of the above mentioned two surfaces smaller, $\Sigma\bar{I}/\Sigma I > 150$ can be made and, by varying said air space, the amount of the spherical aberration can be controlled. However, if the radii of curvature of the above mentioned two surfaces are made smaller, when said air space is varied so that $\Sigma I$ may be the same as in a general photographic lens, $\Sigma\bar{I}$ will remain to have a large value, a high resolving power and high contrast will not be obtained and such lens will not be able to be used as a general photographic lens. On the contrary, when the radii of curvature of the above mentioned two surfaces are made larger, the spherical aberration is corrected to be as small as of a general photographic lens and said air space is varied to be of a soft focus lens, it has been impossible to make $\Sigma\bar{I}/\Sigma I > 50$.

SUMMARY OF THE INVENTION

A primary object of the present invention is to provide a lens system wherein, when made a general photographic lens by varying the spherical aberration by varying an air space, a very high resolving power and high contrast will be obtained and, when made a soft focus lens, $\Sigma\bar{I}/\Sigma I > 150$ will be able to be made.

Another object of the present invention is to provide a lens system wherein a soft focus lens with which the out focus image of the background is fine can be made by varying an air space to under-correct the spherical aberration and also a soft focus lens with which the out focus image of the foreground is fine can be made by varying the air space to over-correct the spherical aberration.

These and other objects of the present invention will become more apparent during the course of the following detailed description and appended claims.

BRIEF DESCRIPTION OF THE DRAWINGS

FIGS. 3a, 3b, 3c and 3d are diagrams showing respectively a spherical aberration, offence sine condition, astigmatism and distortion in the first embodiment when made a general photographic lens;

FIGS. 4a, 4b, 4c and 4d are aberration curve diagrams in the first embodiment when made a soft focus lens by under-correcting the spherical aberration;

FIGS. 5a, 5b, 5c and 5d are aberration curve diagrams in the first embodiment when made a soft focus lens by over-correcting the spherical aberration;

FIG. 6 is a formation view of a second embodiment of the lens system according to the present invention;

DESCRIPTION OF THE PREFERRED EMBODIMENTS

In the following respective embodiments of the variable aberration lens system according to the present invention, the same symbols are attached to the same respective elements.

Figure 1:
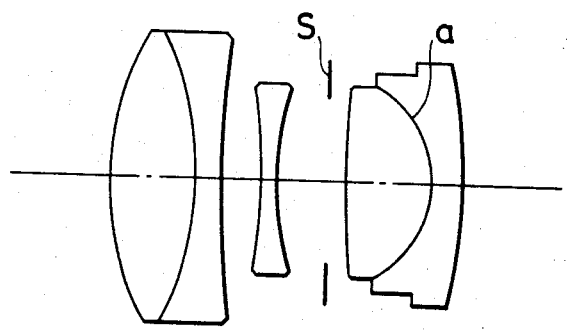
FIG. 1 is a lens formation view of a typical conventional soft focus lens.
Figure 2:
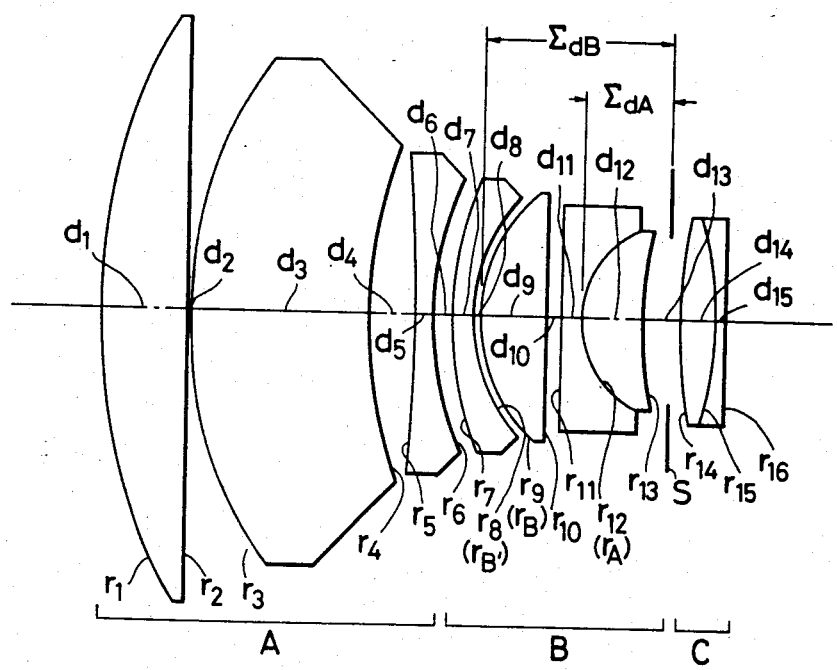
FIG. 2 is a formation view of a first embodiment of the lens system according to the present invention.
Figure 7A:
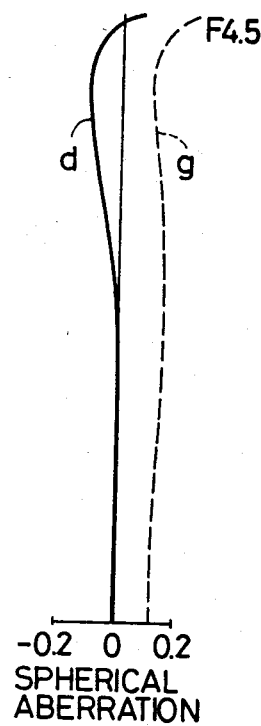
FIGS. 7a, 7b, 7c and 7d are aberration curve diagrams in the second embodiment when made a general photographic lens.
Figure 7B:
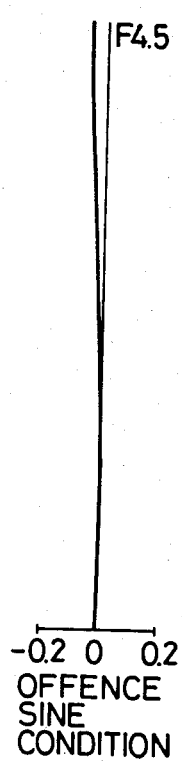
Figure 7C:
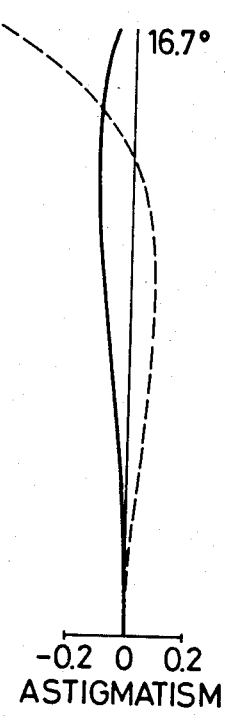
Figure 7D:
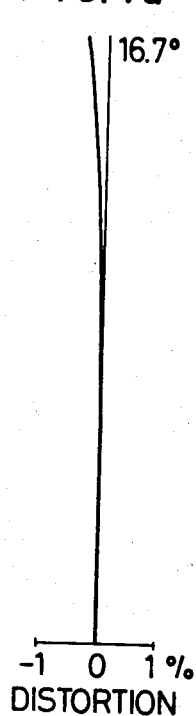
Figure 8A:
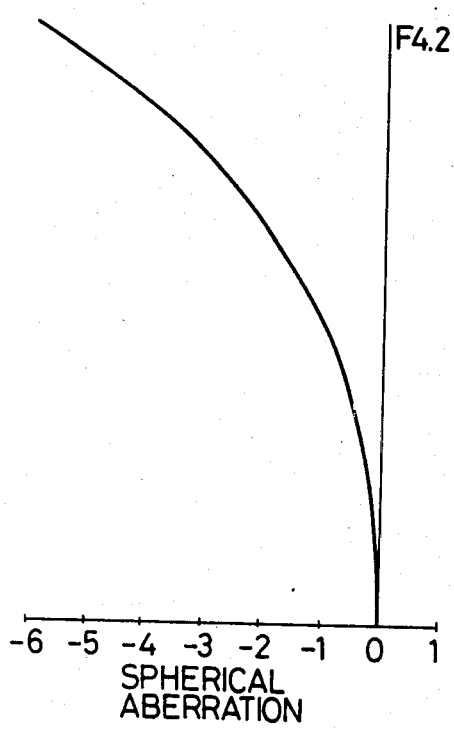
FIGS. 8a, 8b, 8c and 8d are aberration curve diagrams in the second embodiment when made a soft focus lens by under-correcting the spherical aberration.
Figure 8B:
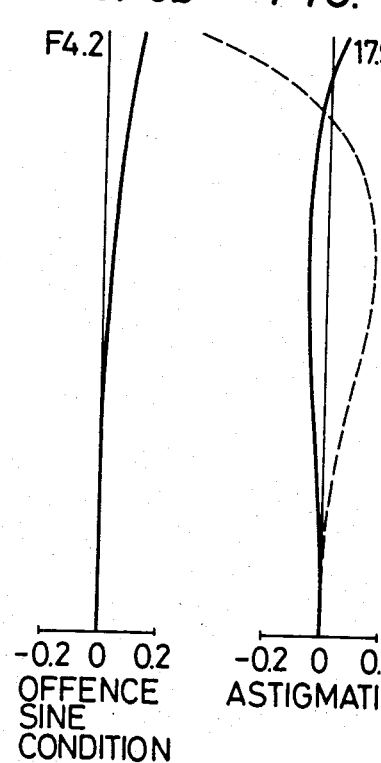
Figures 8C, 8D:
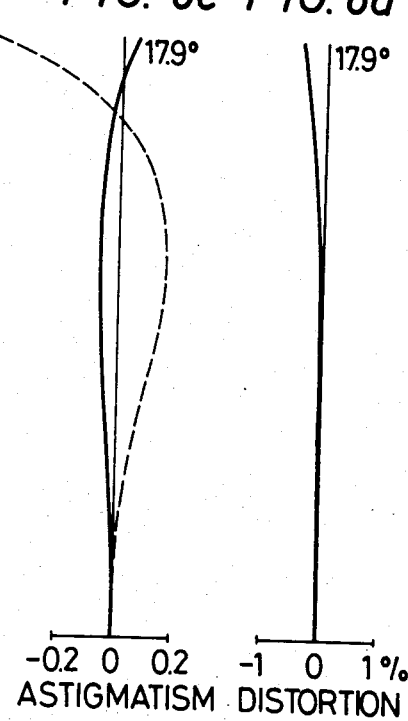
Figure 9A:
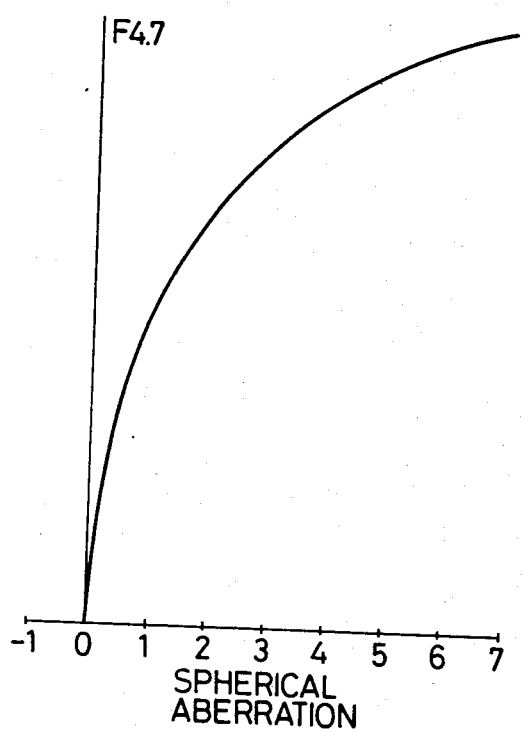
FIGS. 9a, 9b, 9c and 9d are aberration curve diagrams in the second embodiment when made a soft focus lens by over-correcting the spherical aberration.
Figure 9B:
Figure 9C:
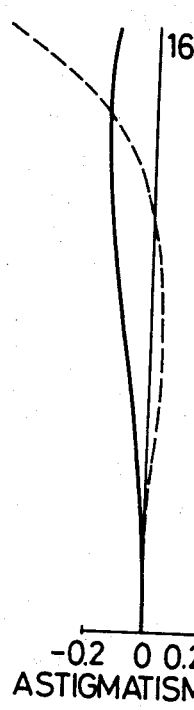
Figure 9D:
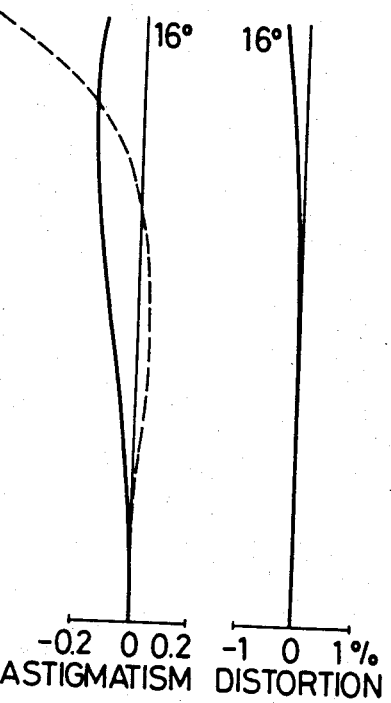

The lens formation of the present invention shall be explained with reference to FIGS. 2 and 6. It is characterized in that a cemented lens having a cementing surface which is concave against a stop S is arranged adjacently to the stop S so that, when the refractive index of the glass on the side far from the stop S of the glasses sandwiching the cementing surface is represented by $n_A$, the refractive index of the glass on the side near to the stop S is represented by $n_A'$, the radius of curvature of the cementing surface is represented by $r_A$, the radius of the full aperture of the stop S is represented by R and the axial distance from the cementing surface to the stop S is represented by $\Sigma d_A$, the conditions of $$0.01 < n_A - n_A' < 0.1$$

$$R < |r_A| < 1.4R$$

and $$0.7\Sigma d_A < |r_A| < 1.4\Sigma d_A$$

will be satisfied, further, an air space is arranged between two surfaces of similar radii of curvature which are concave against the stop S so that, when the radius of curvature of the surface near to the stop S of these two surfaces is represented by $r_B$, the radius of curvature of the surface far from the stop S is represented by $r_B'$ and the axial distance from the surface near the stop S to the stop S is represented by $\Sigma d_B$, the conditions of $$2R < \left| \frac{r_B + r_B'}{2} \right| < 3R \text{ and}$$

$$0.7\Sigma d_B < |r_B| < 1.4\Sigma d_B$$

will be satisfied and the spherical aberration is varied by varying the above mentioned air space.

The theoretical ground of the present invention shall be described in detail in the following. If a cementing surface having a negative refractive power is arranged on the object side from the stop S and the difference between the refractive indexes in the front and rear of the cementing surface is made smaller, a higher degree spherical aberration by the over correction will be generated to be large on this surface. In order to effectively generate a higher degree spherical aberration, it is proper to make $$0.01 < n_A - n_A' > 0.1$$
and
$$R < |r_A| < 1.4R.$$

When the difference between the refractive indexes in the front and rear of the cementing surface is smaller than 0.01, the refractive power of this surface will be too weak and the generated amount of the spherical aberration will be too small. On the contrary, when the above mentioned difference exceeds 0.1, the lower degree aberration will become larger and the high degree aberration will become smaller. If $|r_A|$ is smaller than R, the axial ray in the full aperture of the stop S will not pass or the vignetting will become so large as to be undesirable. When $|r_A|$ is larger than 1.4R, the higher degree spherical aberration will not be able to be generated to be large. Further, in order to generate such various other aberrations than the spherical aberration as the coma, astigmatism and distortion, it is necessary that the center of curvature of the above mentioned cementing surface should be near the center of the stop S, that is, $$0.7\Sigma d_A < |r_A| < 1.4\Sigma d_A.$$

When $|r_A|$ exceeds the above mentioned upper limit value and lower limit value, the symmetricity of the offaxial halos will collapse and no fine soft focus effect will be obtained.

Also, an air space is arranged between two surfaces of similar radii of curvature which are concave against the stop S on the image side from the stop S, a higher degree spherical aberration under-corrected is generated by the cancellation effect through these two surfaces and as a result, the spherical aberration over-corrected by the above mentioned cementing surface is canceled and the spherical aberration of the entire lens system is corrected to be small. It is an advantage of the present invention that the radii of curvature of the above mentioned two surfaces can be made smaller in such case. In order to effectively generate a higher degree aberration by the above mentioned two surfaces, it is proper to make $$2R < \left| \frac{r_B + r_B'}{2} \right| < 3R.$$

When the radii of curvature of the above mentioned two surfaces are smaller than the lower limit value, the ray light will be totally reflected and will not pass often. When the above mentioned radii of curvature are larger than the upper limit value, the higher degree spherical aberration will not be effectively generated. Further, in order to prevent various other aberrations than the spherical aberration from being generated to be large by these two surfaces, it is necessary that, the same as in the case of the above mentioned cementing surface, the centers of curvature of the above mentioned two surfaces should be near the center of the stop S, that is, $$0.7\Sigma d_B < |r_B| < 1.4\Sigma d_B.$$

The condition in which the spherical aberration is corrected to be small as in the above is made a normal condition. When the above mentioned air space is varied, the balance of the cancellation of the spherical aberrations generated by the above mentioned cementing surface and the two surfaces forming the air space will break. When the above mentioned air space is expanded to be larger than in the normal condition, the spherical aberration will be under-corrected and a soft focus lens by which the out focus image of the background is fine will be made. In such case, as the higher degree spherical aberration causes largely the break of the balance of the cancellation, it will be possible to make $$\Sigma \bar{I}/\Sigma I > 150$$

in the condition in which a sufficient soft focus effect is developed. When the above mentioned air space is made narrower than in the normal condition, the spherical aberration will be over-corrected and a soft focus lens by which the out focus image of the foreground is fine will be made. With the slightest variation of the above mentioned air space, the higher degree spherical aberration will vary to be so large that it will be easily possible to continuously vary one lens element to be a soft focus lens of the under correction, a general photographic lens and a soft focus lens of the over correction.

The first embodiment shall be described in detail in the following with reference to FIG. 2. The first embodiment is formed of three lens groups A, B and C in the order mentioned on the image side from the object side. An Ernostar type is fundamentally formed of the lens groups A and C. That is to say, the lens group A is formed of a first positive lens element, a second meniscus positive lens element and a third biconcave lens element in the order mentioned from the object side. The lens group C is a positive lens component. A stop S is arranged just before the lens group C. In the lens group B, a cementing surface $r_A$ which is concave against the stop S is arranged on the object side from the stop S and a variable air space between two surfaces $r_B$ and $r_B'$ which are concave against the stop S is arranged further on the object side from the cementing surface $r_A$.

Examples of the numerical values of the first embodiment are shown in Table 1.

TABLE 1

Embodiment 1
$f = 100.0$  FNO. = 4.5  $2\omega = 25°$

| | Radius of Curvature | Axial Distance | Refractive Index | Abbe Number |
|---|---|---|---|---|
| A | $r_1 = 51.854$ | | | |
| | | $d_1 = 7.129$ | $n_1 = 1.51633$ | $\nu_1 = 64.1$ |
| | $r_2 = \infty$ | | | |
| | | $d_2 = 0.1$ | | |
| | $r_3 = 35.791$ | | | |
| | | $d_3 = 15.362$ | $n_2 = 1.51633$ | $\nu_2 = 64.1$ |
| | $r_4 = 41.845$ | | | |
| | | $d_4 = 3.648$ | | |
| | $r_5 = -294.05$ | | | |
| | | $d_5 = 1.5$ | $n_3 = 1.67270$ | $\nu_3 = 32.1$ |
| | $r_6 = 24.728$ | | | |
| | | $d_6 = 1.969$ | | |
| | $r_7 = 29.724$ | | | |
| | | $d_7 = 1.489$ | $n_4 = 1.51633$ | $\nu_4 = 64.1$ |
| | $r_8(r_B) = 13.733$ | | | |
| | | $d_8 = 0.937$ (variable) | | |
| B | $r_9(r_B') = 13.877$ | | | |
| | | $d_9 = 5.677$ | $n_5 = 1.51633$ | $\nu_5 = 64.1$ |
| | $r_{10} = \infty$ | | | |
| | | $d_{10} = 1$ | | |
| | $r_{11} = \infty$ | | | |
| | | $d_{11} = 1.75$ | $n_6 = 1.60311$ | $\nu_6 = 60.7$ |
| | $r_{12}(r_A) = 8$ | | | |
| | | $d_{12} = 5.5$ | $n_7 = 1.58913$ | $\nu_7 = 61.1$ |
| | $r_{13} = 33.211$ | | | |
| | | $d_{13} = 3.371$ | | |
| C | $r_{14} = 61.089$ | | | |
| | | $d_{14} = 2.837$ | $n_8 = 1.77250$ | $\nu_8 = 49.6$ |
| | $r_{15} = -27.635$ | | | |

TABLE 1-continued

Embodiment 1
$f = 100.0$  FNO. = 4.5  $2\omega = 25°$

| Radius of Curvature | Axial Distance | Refractive Index | Abbe Number |
|---|---|---|---|
| | $d_{15} = 1$ | $n_9 = 1.54072$ | $\nu_9 = 47.2$ |
| $r_{16} = -240.19$ | | | |

The stop S is 2.25 behind $r_{13}$.

$\Sigma d_A = d_{12} + 2.25 = 7.75$ $\Sigma d_B = d_9 + d_{10} + d_{11} + d_{12} + 2.25 = 16.177$

R = 6.78

Next, the third degree aberration coefficients and the fifth degree spherical aberration coefficients in the normal condition of the first embodiment are shown in Table 2. The aberration curve diagrams of the spherical aberration, offence sine condition, astigmatism and distortion are shown respectively in FIGS. 3a, 3b, 3c and 3d.

TABLE 2

Embodiment 1

| | I | II | III | P | V | I* |
|---|---|---|---|---|---|---|
| 1 | 1.6107 | −0.2739 | 0.0466 | 0.6567 | −0.1196 | 13.9352 |
| 2 | 0.5318 | −0.9002 | 1.5239 | 0. | −2.5798 | 10.0956 |
| 3 | 0.0917 | −0.0007 | 0. | 0.9514 | −0.0069 | 0.3817 |
| 4 | 0.0146 | 0.0901 | 0.5546 | −0.8137 | −1.5960 | −1.2064 |
| 5 | −1.9557 | 2.5379 | −3.2934 | −0.1368 | 4.4512 | −41.6192 |
| 6 | −5.3021 | −0.6451 | −0.0785 | −1.6264 | −0.2074 | −150.5601 |
| 7 | 3.2660 | 0.7880 | 0.1901 | 1.1456 | 0.3223 | 89.6006 |
| 8 | −54.0637 | 4.2854 | −0.3397 | −2.4795 | 0.2235 | −5530.1122 |
| 9 | 56.8974 | −3.7288 | 0.2444 | 2.4520 | −0.1767 | 6183.3321 |
| 10 | 0.1526 | −0.3516 | 0.8099 | 0. | −1.8657 | 4.6431 |
| 11 | −0.1630 | 0.3756 | −0.8652 | 0. | 1.9931 | −4.9474 |
| 12 | −3.1668 | 0.0547 | −0.0009 | −0.0686 | 0.0012 | −549.9618 |
| 13 | −1.9546 | −1.3594 | −0.9455 | −1.1163 | −1.4339 | −64.1921 |
| 14 | 0.6458 | 0.7671 | 0.9113 | 0.7134 | 1.9299 | 24.7404 |
| 15 | 2.7232 | −0.8616 | 0.2726 | 0.3071 | −0.1834 | 64.9458 |
| 16 | 0.5949 | −0.7398 | 0.9200 | 0.1461 | −1.3258 | 2.9451 |
| Σ | −0.0773 | 0.0377 | −0.0498 | 0.1311 | −0.5741 | 52.0203 |

(In the above, I, II, III and V represent respectively the third degree spherical aberration, coma, astigmatism and distortion, P represents a petzval sum and I represents the fifth degree spherical aberration coefficients.)

Now, the aberration coefficients when $d_8$ is 1.937 and the spherical aberration is under-corrected are shown in Table 3 and the aberration curve diagrams then are shown in FIGS. 4a, 4b, 4c and 4d. The aberration coefficients when $d_8$ is 0.187 and the spherical aberration is over-corrected are shown in Table 4 and the aberration curve diagrams then are shown in FIGS. 5a, 5b, 5c and 5d.

TABLE 3

Embodiment 1

| | I | II | III | P | V | I* |
|---|---|---|---|---|---|---|
| 1 | 1.3896 | −0.2562 | 0.0490 | 0.6176 | −0.1275 | 1.2503 |
| 2 | 0.4423 | −0.8008 | 1.4498 | 0. | −2.6248 | 7.4260 |
| 3 | 0.0763 | −0.0014 | 0. | 0.8947 | −0.0162 | 0.2807 |
| 4 | 0.0122 | 0.0795 | 0.5199 | −0.7653 | −1.6043 | −0.8874 |
| 5 | −1.6266 | 2.2615 | −3.1441 | −0.1286 | 4.5500 | −30.6139 |
| 6 | −4.4098 | −0.5246 | −0.0624 | −1.5295 | −0.1894 | −110.7478 |
| 7 | 2.7164 | 0.6686 | 0.1646 | 1.0773 | 0.3057 | 65.9077 |
| 8 | −44.9656 | 4.2581 | −0.4032 | −2.3318 | 0.2590 | −4067.7957 |
| 9 | 51.0931 | −3.4354 | 0.2310 | 2.3059 | −0.1706 | 5253.7175 |
| 10 | 0.1657 | −0.3680 | 0.8171 | 0. | −1.8144 | 12.9850 |
| 11 | −0.1769 | 0.3928 | −0.8723 | 0. | 1.9369 | −13.8471 |
| 12 | −2.8228 | 0.0501 | −0.0009 | −0.0645 | 0.0012 | −455.0246 |

TABLE 3-continued

| | | | Embodiment 1 | | | |
|---|---|---|---|---|---|---|
| | I | II | III | P | V | I* |
| 13 | −1.6037 | −1.1699 | −0.8535 | −1.0498 | −1.3885 | −24.5672 |
| 14 | 0.5025 | 0.6354 | 0.8033 | 0.6709 | 1.8639 | 4.3906 |
| 15 | 2.5060 | −0.8076 | 0.2603 | 0.2888 | −0.1770 | 78.4140 |
| 16 | 0.5899 | −0.7280 | 0.8984 | 0.1374 | −1.2783 | 20.7629 |
| Σ | 3.8386 | 0.2541 | −0.1430 | 0.1232 | −0.4742 | 750.6511 |

ΣI*/ΣI = 195

TABLE 4

| | | | Embodiment 1 | | | |
|---|---|---|---|---|---|---|
| | I | II | III | P | V | I* |
| 1 | 1.8639 | −0.2884 | 0.0446 | 0.6894 | −0.1136 | 17.7751 |
| 2 | 0.6154 | −0.9878 | 1.5857 | 0. | −2.5453 | 12.8774 |
| 3 | 0.1061 | 0. | 0. | 0.9988 | 0.0003 | 0.4868 |
| 4 | 0.0169 | 0.0994 | 0.5837 | −0.8543 | −1.5895 | −1.5389 |
| 5 | −2.2632 | 2.7811 | −3.4174 | −0.1436 | 4.3758 | −53.0874 |
| 6 | −6.1357 | −0.7653 | −0.0930 | −1.7075 | −0.2216 | −192.0473 |
| 7 | 3.7795 | 0.8958 | 0.2123 | 1.2027 | 0.3354 | 114.2902 |
| 8 | −62.5640 | 4.2727 | −0.2918 | −2.6032 | 0.1977 | −7053.9470 |
| 9 | 62.1002 | −3.9836 | 0.2555 | 2.5743 | −0.1815 | 7045.2358 |
| 10 | 0.1425 | −0.3883 | 0.8029 | 0. | −1.9056 | −2.9605 |
| 11 | −0.1523 | 0.3616 | −0.8581 | 0. | 2.0368 | 3.1758 |
| 12 | −3.4764 | 0.0587 | −0.0010 | −0.0720 | 0.0012 | −640.6573 |
| 13 | −2.2837 | −1.5287 | −1.0233 | −1.1719 | −1.4695 | −110.9152 |
| 14 | 0.7841 | 0.8868 | 1.0031 | 0.7490 | 1.9817 | 50.4747 |
| 15 | 2.9158 | −0.9080 | 0.2828 | 0.3224 | −0.1885 | 48.1568 |
| 16 | 0.5996 | −0.7496 | 0.9371 | 0.1534 | −1.3632 | −15.2247 |
| Σ | −3.9514 | −0.1835 | 0.0230 | 0.1376 | −0.6494 | −777.9055 |

ΣI*/ΣI = 197

The second embodiment shall be described in detail in the following with reference to FIG. 6. In the second embodiment, a triplet type is fundamentally formed of three lens groups I, II and III in the order mentioned on the image side from the object side. The lens group II is arranged just before the stop S and has a cementing surface $r_A$ which is concave against the stop S. The lens group III has a variable air space between two surfaces $r_B$ and $r_B'$ which are concave against the stop S. The lens group I is a positive doublet.

Examples of the numerical values of the second embodiment are shown in Table 5.

TABLE 5

Embodiment 2

$f = 100.0$  FNO. = 4.5  $2\omega = 33.5°$

I
- $r_1 = 37.109$
  - $d_1 = 10$  $n_1 = 1.72000$  $\nu_1 = 50.2$
- $r_2 = -44.007$
  - $d_2 = 2.667$  $n_2 = 1.51633$  $\nu_2 = 64.1$
- $r_3 = 237.148$ $d_3 = 2.721$

II
- $r_4 = -53.982$
  - $d_4 = 2.271$  $n_3 = 1.68893$  $\nu_3 = 31.1$
- $r_5(r_A) = 9.811$
  - $d_5 = 8.207$  $n_4 = 1.6727$  $\nu_4 = 32.1$
- $r_6 = 34.120$

TABLE 5-continued

Embodiment 2

$d_6 = 8.264$

III
- $r_7 = 72.784$
  - $d_7 = 10.601$  $n_5 = 1.72000$  $\nu_5 = 50.2$
- $r_8(r_B) = -21.306$
  - $d_8 = 1.287$  (variable)
- $r_9(r_B') = -20.602$
  - $d_9 = 2$  $n_6 = 1.72000$  $\nu_6 = 50.2$
- $r_{10} = -82.893$ The stop S is 1.723 behind $r_6$.

$\Sigma d_A = d_5 + 1.723 = 9.93$ $\Sigma d_B = d_7 + 6.541 = 17.142$ $R = 8.144$ Now, the third degree aberration coefficients and the fifth degree spherical aberration coefficients in the normal condition of the second embodiment are shown in Table 6 and the aberration curve diagrams are shown in FIGS. 7a, 7b, 7c and 7d.

TABLE 6

| | | | Embodiment 2 | | | |
|---|---|---|---|---|---|---|
| | I | II | III | P | V | I* |
| 1 | 4.7627 | 0.4663 | 0.0456 | 1.1281 | 0.1149 | 78.5069 |
| 2 | 9.5111 | −3.9575 | 1.6467 | 0.1775 | −0.7590 | 514.6278 |
| 3 | 3.1708 | −2.6552 | 2.2234 | −0.1436 | −1.7417 | 217.0966 |
| 4 | −18.1837 | 8.9823 | −4.4370 | −0.7556 | 2.5650 | −894.4267 |
| 5 | −4.2616 | 0.0603 | −0.0009 | −0.0586 | 0.0008 | −741.8722 |
| 6 | −3.3946 | −1.7751 | −0.9282 | −1.1787 | −1.1017 | −158.0567 |
| 7 | 0.7682 | 0.8113 | 0.8567 | 0.5751 | 1.5121 | 49.3594 |
| 8 | 77.2566 | 0.9870 | 0.0126 | 1.9647 | 0.0253 | 7935.7417 |
| 9 | −71.6380 | −1.7538 | −0.0429 | −2.0318 | −0.0508 | −6903.1803 |
| 10 | 1.9982 | −1.0206 | 0.5213 | 0.5050 | −0.5242 | 18.2873 |

TABLE 6-continued

| | Embodiment 2 | | | | | |
|---|---|---|---|---|---|---|
| | I | II | III | P | V | I* |
| Σ | −0.0103 | 0.1449 | −0.1206 | 0.1820 | 0.0408 | 116.0837 |

The aberration coefficients when $d_8$ is 2.287 and the spherical aberration is under-corrected are shown in Table 7 and the aberration curve diagrams then are shown in FIGS. 8a, 8b, 8c and 8d. The aberration coefficients when $d_8$ is 0.62 and the spherical aberration is over-corrected are shown in Table 8 and the aberration curve diagrams are shown in FIGS. 9a, 9b, 9c and 9d.

TABLE 7

| | Embodiment 2 | | | | | |
|---|---|---|---|---|---|---|
| | I | II | III | P | V | I* |
| 1 | 3.8528 | 0.4048 | 0.0425 | 1.0511 | 0.1149 | 55.1382 |
| 2 | 7.6941 | −3.4359 | 1.5343 | 0.1653 | −0.7590 | 362.4415 |
| 3 | 2.5650 | −2.3052 | 2.0717 | −0.1338 | −1.7417 | 152.4747 |
| 4 | −14.7099 | 7.7984 | −4.1343 | −0.7041 | 2.5650 | −628.1877 |
| 5 | −3.4475 | 0.0524 | −0.0008 | −0.0546 | 0.0008 | −521.0433 |
| 6 | −2.7461 | −1.5411 | −0.8649 | −1.0983 | −1.1017 | −111.0089 |
| 7 | 0.6215 | 0.7043 | 0.7983 | 0.5359 | 1.5121 | 34.6668 |
| 8 | 62.4975 | 0.8569 | 0.0118 | 1.8306 | 0.0253 | 5573.5540 |
| 9 | −52.4971 | −1.7331 | −0.0572 | −1.8932 | −0.0644 | −4120.7137 |
| 10 | 1.6862 | −0.9149 | 0.4964 | 0.4705 | −0.5246 | 42.1160 |
| Σ | 5.5166 | −0.1134 | −0.1021 | 0.1696 | 0.0267 | 838.4376 |

ΣI*/ΣI = 152

TABLE 8

| | Embodiment 2 | | | | | |
|---|---|---|---|---|---|---|
| | I | II | III | P | V | I* |
| 1 | 5.5343 | 0.5153 | 0.0480 | 1.1859 | 0.1149 | 100.8295 |
| 2 | 11.0520 | −4.3741 | 1.7312 | 0.1866 | −0.7590 | 660.9570 |
| 3 | 3.6844 | −2.9347 | 2.3376 | −0.1510 | −1.7417 | 278.8258 |
| 4 | −21.1296 | 9.9279 | −4.6647 | −0.7944 | 2.5650 | −1148.7477 |
| 5 | −4.9521 | 0.0667 | −0.0009 | −0.0616 | 0.0008 | −952.8159 |
| 6 | −3.9445 | −1.9619 | −0.9758 | −1.2392 | −1.1017 | −202.9985 |
| 7 | 0.8927 | 0.8967 | 0.9007 | 0.6047 | 1.5121 | 63.3942 |
| 8 | 89.7725 | 1.0909 | 0.0133 | 2.0655 | 0.0253 | 10192.1879 |
| 9 | −88.7759 | −1.7266 | −0.0336 | −2.1361 | −0.0422 | −9842.9779 |
| 10 | 22.514 | −1.1015 | 0.5389 | 0.5309 | −0.5234 | −11.9041 |
| Σ | −5.6147 | 0.3985 | −0.1054 | 0.1914 | 0.0502 | −863.2551 |

ΣI*/I = 154

I claim:

1. A variable aberration lens system characterized in that said lens system comprises a stop, two cemented lens elements arranged adjacently to said stop and having therebetween a cementing surface which is concave against said stop, and a variable air space arranged between two surfaces having similar radii of curvature which are concave against said stop and capable of varying the spherical aberration; that the condition of $$0.01 < n_A - n_A' < 0.1$$

$$R < |r_A| < 1.4R$$

and $$0.7\Sigma d_A < |r_A| < 1.4\Sigma d_A$$

are satisfied, wherein $N_A$ represents the refractive index of one on the side far from said stop of said two cemented lens elements, $n_A'$ represents the refractive index of the other on the side near to said stop of said two cemented lens elements, $r_A$ represents the radius of curvature of said cementing surface, R represents the radius of the full aperture of said stop and $\Sigma dA$ represents the axial distance from said cementing surface to said stop; and that the conditions of $$2R < \left| \frac{r_B + r_B'}{2} \right| < 3R \text{ and}$$

$$0.7\Sigma d_B < |r_B| < 1.4\Sigma d_B$$

are satisfied, wherein $r_B$ represents the radius of curvature of one near to said stop of said two surfaces, $r_B'$ represents the radius of curvature of the other far from said stop of said two surfaces and $\Sigma d_B$ represents the axial distance from said one near said stop of said two surfaces to said stop, and that the following condition is satisfied in at least one of $d_{MAX}$ and $d_{MIN}$:

$$\Sigma \overset{*}{I}/\Sigma I > 150$$

wherein $d_{MAX}$ represents the maximum width of said variable air space, $d_{MIN}$ represents the minimum width of said variable air space, ΣI represents a sum of the third degree spherical aberration coefficients and Σİ represents a sum of the fifth degree spherical aberration coefficients.

2. A variable aberration lens system according to claim 1 in which said cementing surface is on the object side from said stop and said two surfaces are farther on the object side from said cementing surface.

3. A variable aberration lens system according to claim 2 in which said lens system is formed of a first lens group, second lens group and third lens group arranged in the order mentioned from the object side; said first lens group is formed of a first positive lens element, second meniscus positive lens element and third biconcave lens element; said second lens group is arranged just before said stop and includes said cementing surface and two surfaces; and said third lens group is formed of a positive lens component.

4. A variable aberration lens system according to claim 1 in which said cementing surface is on the object side from said stop and said two surfaces are on the image side from said stop.

5. A variable aberration lens system according to claim 4 in which said lens system is formed of a first lens group, second lens group and third lens group in the order mentioned from the object side; said first lens group is a positive lens component; said second lens group is a negative lens component arranged just before said stop and includes said cementing surface; and said third lens group is arranged just behind said stop and includes said two surfaces.

* * * * *